(12) United States Patent
Liao

(10) Patent No.: US 6,826,896 B1
(45) Date of Patent: Dec. 7, 2004

(54) LAWN MOWER WITH GRASS-SHREDDING DEVICE

(76) Inventor: Juei-Seng Liao, No. 396, Yung-Ming St., Ta-Li City, Taichung Hsien (TW)

( * ) Notice: Subject to any disclaimer, the term of this patent is extended or adjusted under 35 U.S.C. 154(b) by 0 days.

(21) Appl. No.: 10/737,979

(22) Filed: Dec. 16, 2003

(30) Foreign Application Priority Data

Oct. 7, 2003 (TW) .................................... 92217951 U

(51) Int. Cl.⁷ ............................................. A01D 34/03

(52) U.S. Cl. ...................................................... 56/17.5

(58) Field of Search .............................. 56/10.7, 13.5, 56/17.5

(56) References Cited

U.S. PATENT DOCUMENTS

| | | | | | |
|---|---|---|---|---|---|
| 2,956,386 A | * | 10/1960 | Niemann | ..................... | 56/13.8 |
| 3,664,097 A | * | 5/1972 | Pedigo | .......................... | 56/1 |
| 3,846,963 A | * | 11/1974 | Pedigo | ..................... | 56/13.3 |
| 3,877,207 A | * | 4/1975 | Lemelson | ................... | 56/13.2 |
| 5,020,309 A | * | 6/1991 | Hopkins | ................... | 56/13.3 |
| 5,142,851 A | * | 9/1992 | Lydy et al. | ................. | 56/13.4 |

* cited by examiner

Primary Examiner—Thomas B. Will
Assistant Examiner—Alicia Torres
(74) Attorney, Agent, or Firm—Gray Care Ware & Freidenrich LLP

(57) ABSTRACT

A lawn mower includes a vehicle body, and a grass-cutting unit for cutting grass into long grass strips that move into a grass-shredding device, within which the long grass strips are shredded. Shredded grass drops from the grass-shredding device onto the lawn so as to serve as humus.

3 Claims, 8 Drawing Sheets

LAWN MOWER WITH GRASS-SHREDDING DEVICE

CROSS-REFERENCE TO RELATED APPLICATION

This application claims priority of Taiwanese Application No. 092217951, filed on Oct. 7, 2003.

BACKGROUND OF THE INVENTION

1. Field of the Invention

This invention relates to a lawn mower, and more particularly to a lawn mower that includes a grass-shredding device.

2. Description of the Related Art

Referring to FIGS. 1 and 2, a conventional lawn mower 10 is shown to include a vehicle body 11, four wheels 12 disposed rotatably on the vehicle body 11, a motor 13, a rotatable blade 14 disposed under a deck of the vehicle body 11, and two handle bars 15 extending radially from the vehicle body 11. The motor 13 can be started to rotate the blade 14 for performing a grass-cutting operation. The conventional lawn mower 10 has a drawback in that it is necessary to collect the cut grass after the grass-cutting operation, thereby resulting in manpower waste.

SUMMARY OF THE INVENTION

The object of this invention is to provide a lawn mower that includes a grass-shredding device for shredding grass to form shredded grass which drops from the grass-shredding device onto the lawn so as to serve as humus.

According to this invention, a lawn mower includes a vehicle body, and a grass-cutting unit for cutting grass into long grass strips that move into a grass-shredding device, within which the long grass strips are shredded. Shredded grass drops from the grass-shredding device onto the lawn so as to serve as humus.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
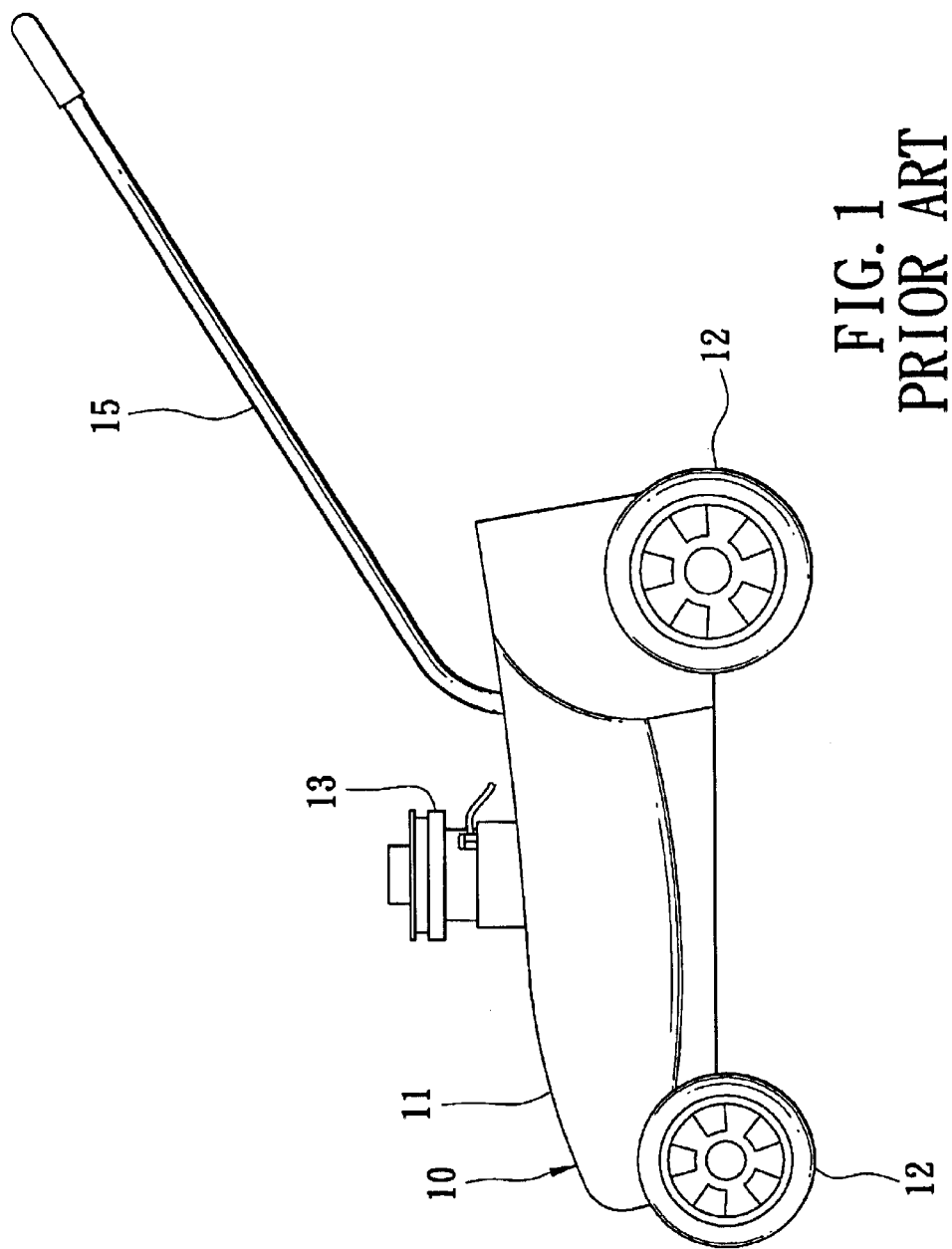
FIG. 1 is a side view of a conventional lawn mower.
Figure 2:
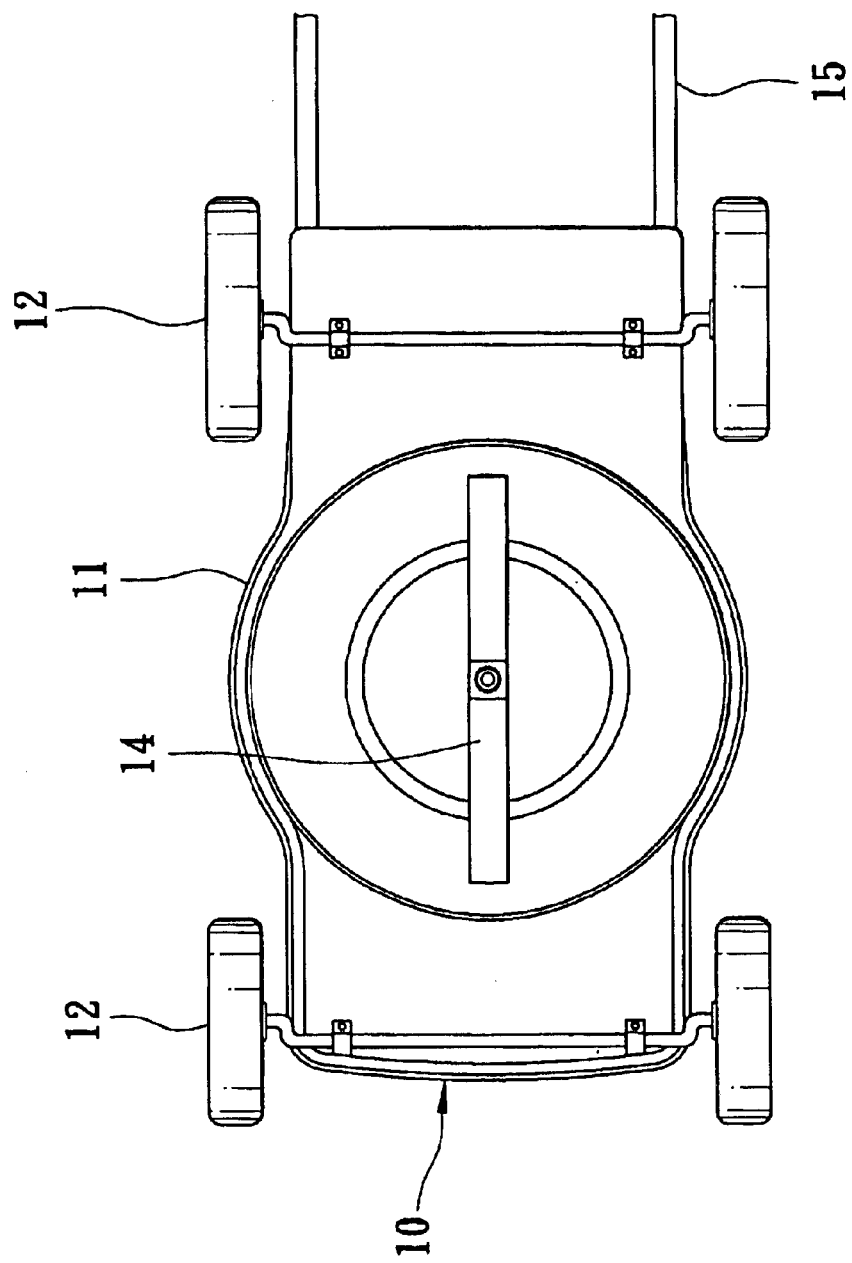
FIG. 2 is a bottom view of the conventional lawn mower.
Figure 3:
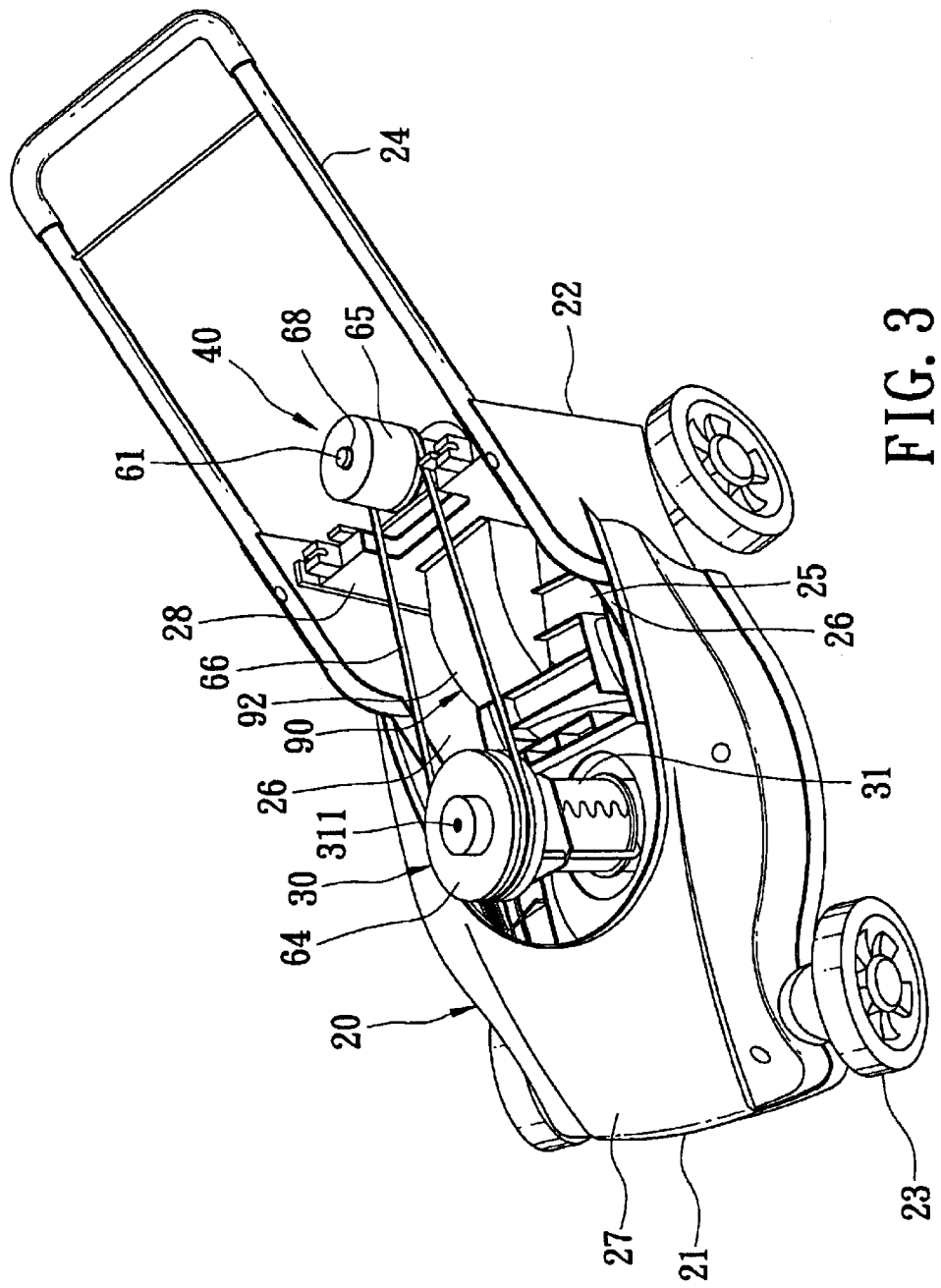
FIG. 3 is an assembled perspective view of the preferred embodiment of a lawn mower according to this invention.
Figure 4:
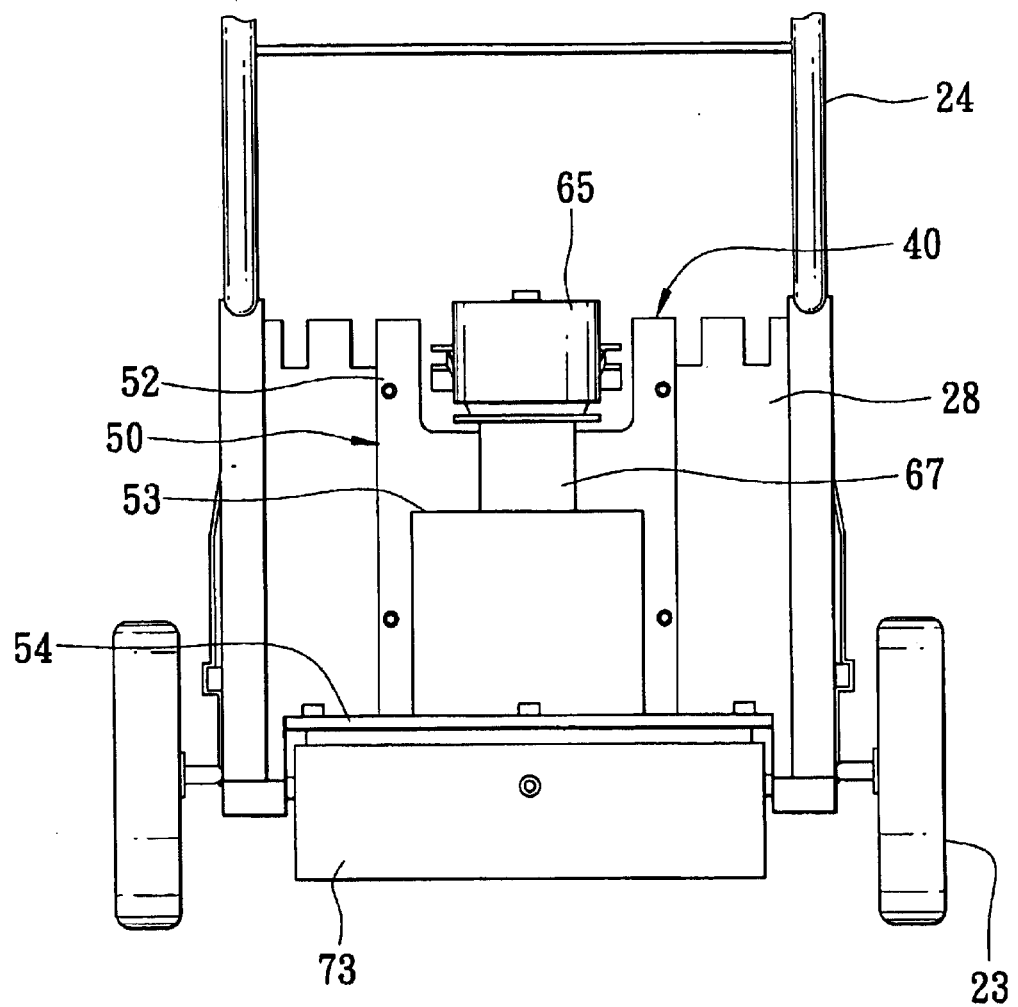
FIG. 4 is a rear view of the preferred embodiment.
Figure 5:
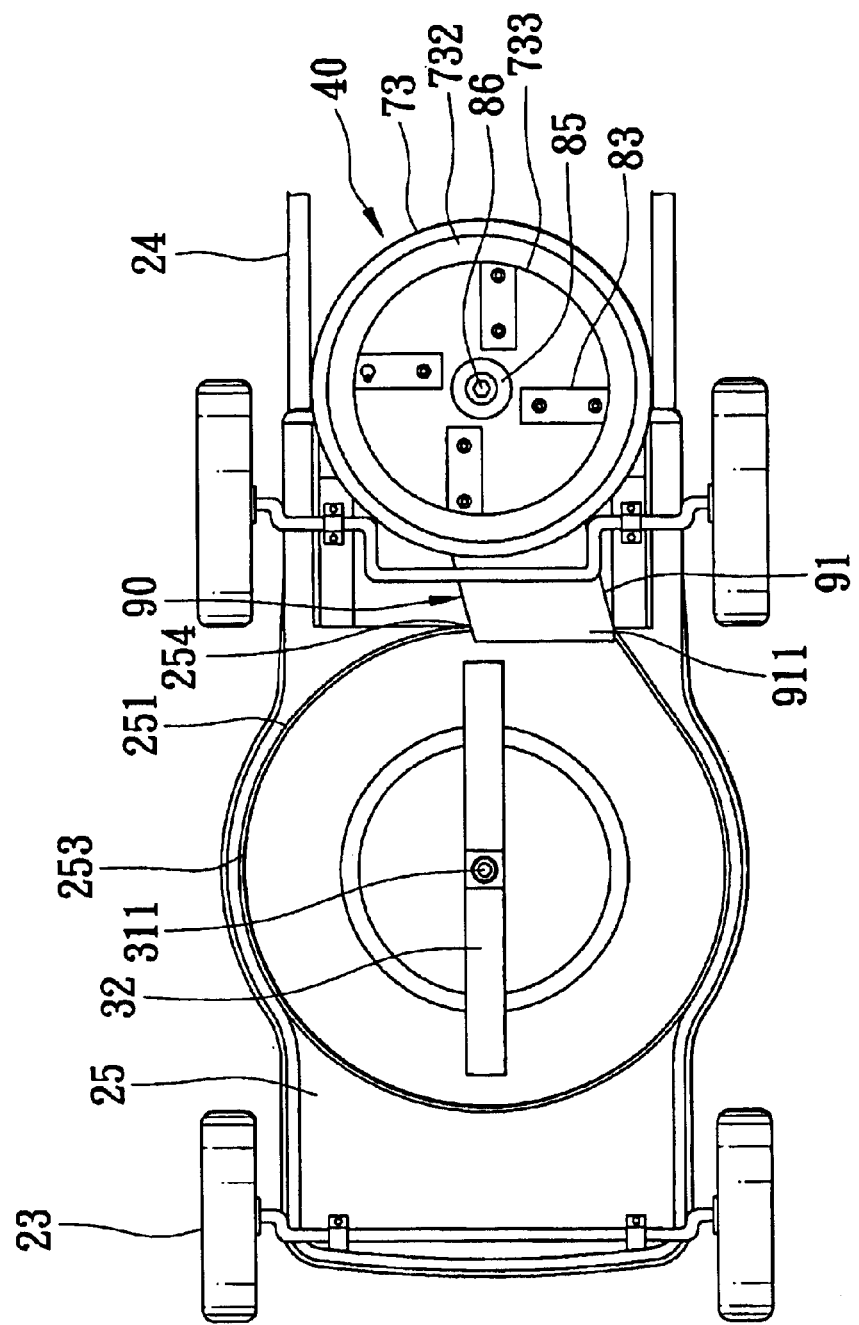
FIG. 5 is a bottom view of the preferred embodiment.

Referring to FIGS. 3, 4, and 5, the preferred embodiment of a lawn mower according to this invention is shown to include a vehicle body 20, a grass-cutting unit 30, a grass-shredding device 40, and a grass-guiding member 90. The grass-shredding device 40 includes a grass-accepting unit 50, a threaded impeller 60, a first short blade assembly 70, a second short blade assembly 80, and a third short blade assembly 80'.

Figure 6:
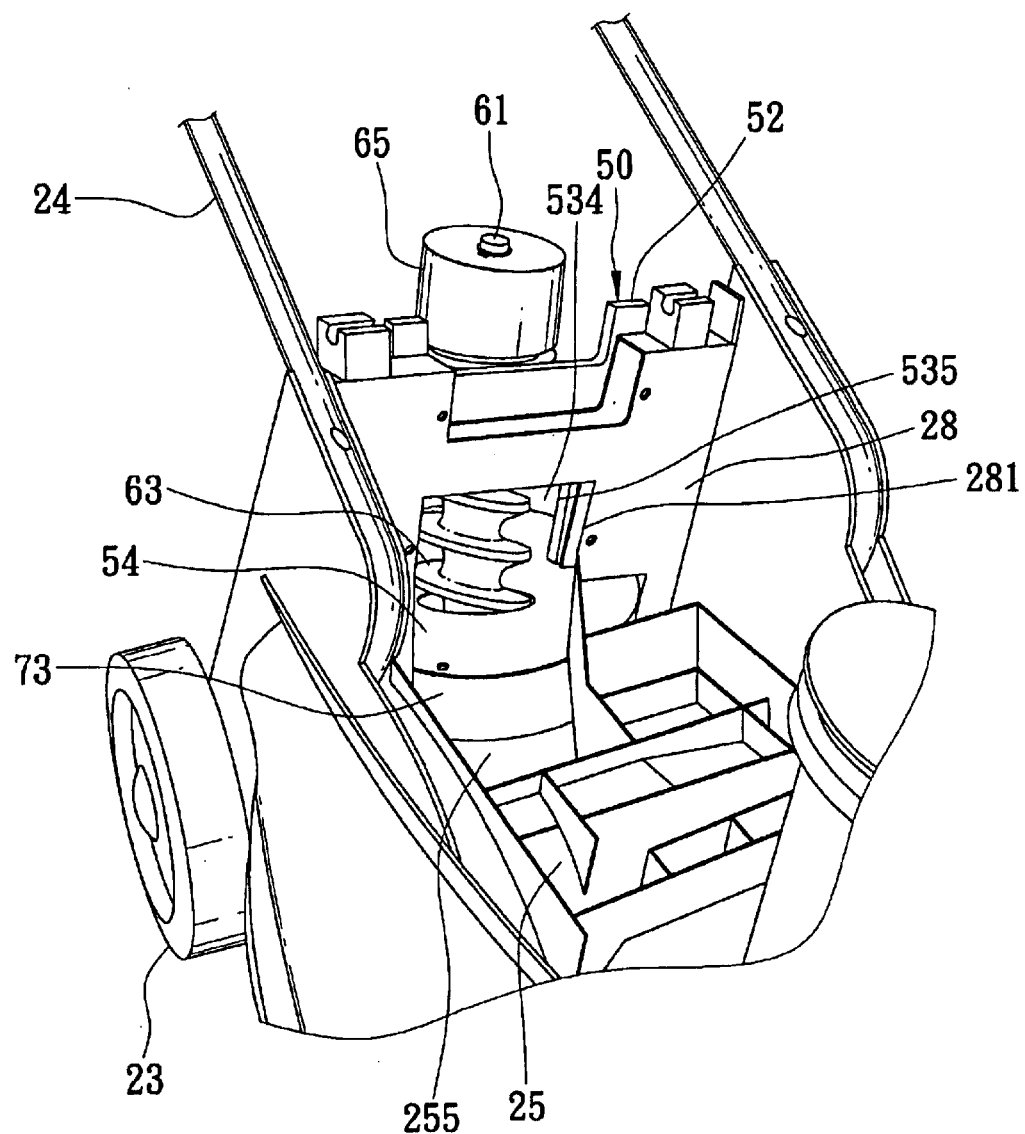
FIG. 6 is a fragmentary perspective view of the preferred embodiment.

The vehicle body 20 includes a front end 21, a rear end 22, a wheel unit 23, two handle bars 24 extending rearwardly from the rear end 22, a deck 25, and a plate assembly consisting of two side plates 26, a front cover plate 27, and a rear plate 28. The deck 25 is formed with a C-shaped surrounding wall 251 that is connected fixedly thereto and that extends downwardly therefrom so as to define a grass-cutting chamber 253 therein. The grass-cutting chamber 253 has a top end that is defined by the deck 25. Two spaced-apart ends of the C-shaped surrounding wall 251 define a gap 254 therebetween. The deck 25 further has a through hole 255 (see FIGS. 6 and 8) that is formed therethrough and that is communicated with the grass-cutting chamber 253 through the gap 254. The rear plate 28 has a bottom notch 281 (see FIGS. 6, 7, and 8) that is communicated with the through hole 255 in the deck 25.

The grass-cutting unit 30 includes a motor 31 with a motor shaft 311, and a horizontal long blade 32. The motor 31 is disposed on the deck 25 among the side plates 26, the front cover plate 27, and the rear plate 28. The long blade 32 is disposed rotatably within the grass-cutting chamber 253, and has a middle portion that is sleeved fixedly around the motor shaft 311. As such, the motor 31 can rotate the long blade 32 within the grass-cutting chamber 253 so as to cut the grass within the grass-cutting chamber 253 in a known manner to form long grass strips 100 (see FIG. 8) that are thrown out of the grass-cutting chamber 253 through the gap 254 in a rearward direction.

Figure 7:
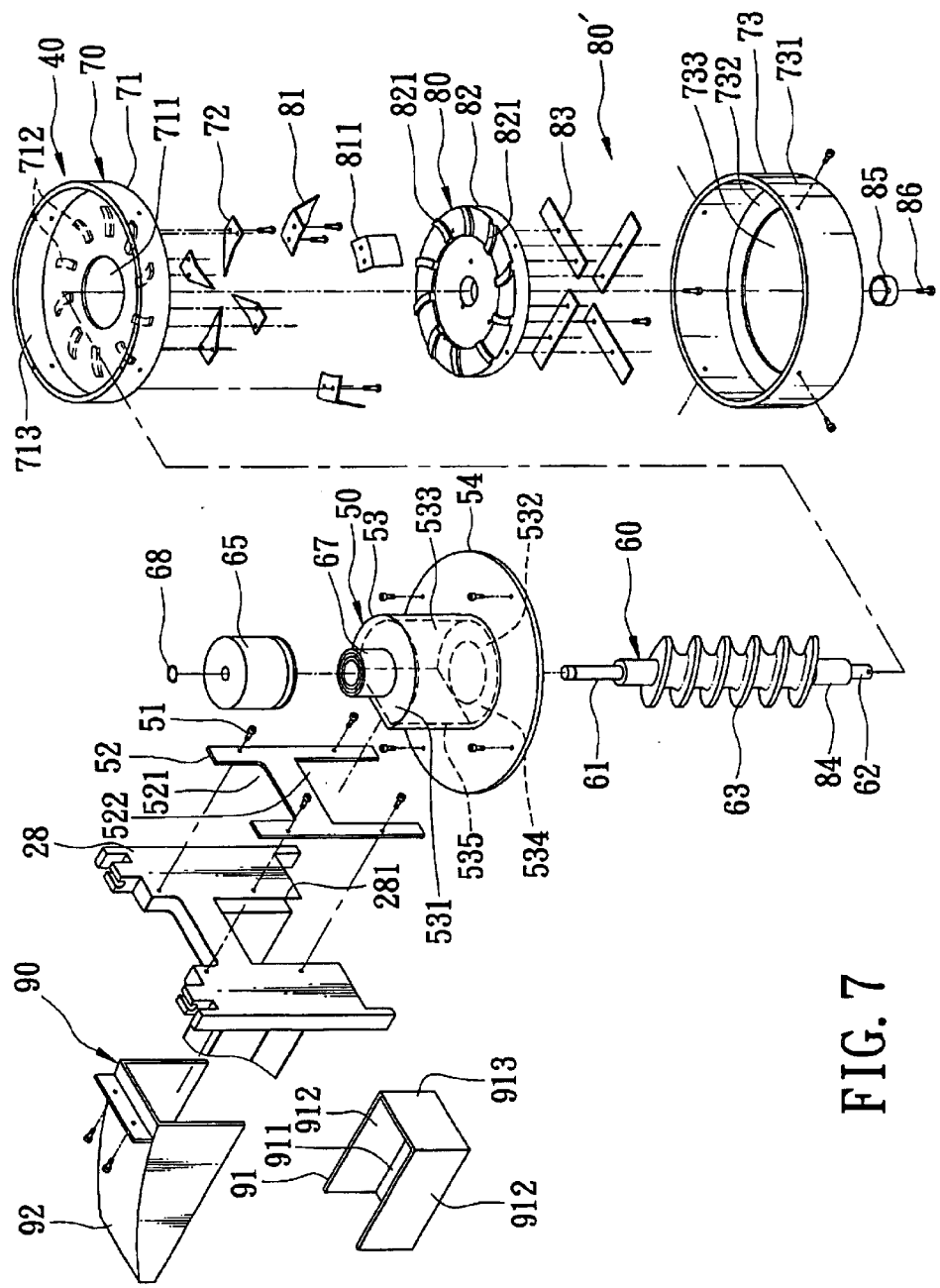
FIG. 7 is a fragmentary exploded perspective view of the preferred embodiment.
Figure 8:
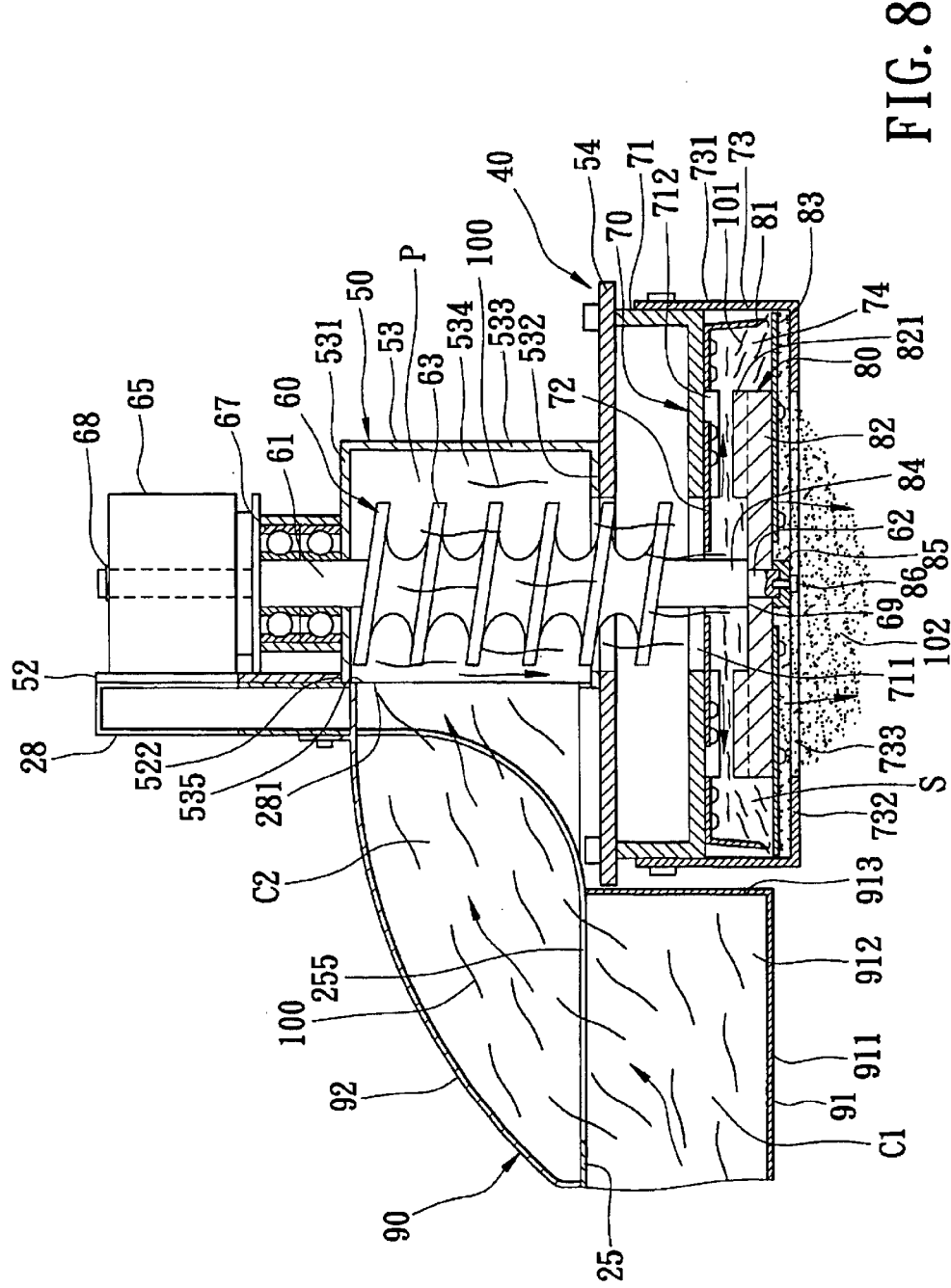
FIG. 8 is a fragmentary sectional view of the preferred embodiment.

Referring to FIGS. 7 and 8, the grass-accepting unit 50 includes a fixed vertical plate 52, a grass-catching member 53, and a horizontal ring plate 54. The fixed vertical plate 52 is H-shaped, is connected fixedly to the rear plate 28 by a plurality of bolts 51, and is formed with a top notch 521 and a bottom notch 522 that is adjacent to and that is aligned with the bottom notch 281 in the rear plate 28. The grass-catching member 53 has an annular top plate 531, an annular bottom plate 532, a curved plate 533 having top and bottom ends that are connected respectively and fixedly to the top and bottom plates 531, 532, a grass-catching chamber 534 defined among the top plate 531, the bottom plate 532, and the curved plate 533, and a grass inlet 535 that is defined between two ends of the curved plate 533 and that is adjacent to and that is aligned with the bottom notch 522 in the fixed vertical plate 52.

The threaded impeller 60 includes an upright rod body 61 extending through the top and bottom plates 531, 532 and the ring plate 54, and a helical rib 63 that is formed on an intermediate portion of the rod body 61, that extends through the bottom plate 532 and the ring plate 54, and that is disposed under the top plate 531. A driving pulley 64 (see FIG. 3) is sleeved fixedly around the motor shaft 311 (see FIG. 3). A driven pulley 65 is sleeved fixedly around a top end of the rod body 61. An endless belt 66 (see FIG. 3) is trained on the driving pulley 64 and the driven pulley 65 so as to rotate the rod body 61. A bearing unit 67 is mounted on the top plate 531, and is sleeved around the rod body 61 so as to enable smooth rotation of the threaded impeller 60. A retaining ring 68 is sleeved fixedly around the top end of the rod body 61, and abuts against a top surface of the driven pulley 65 so as to prevent removal of the driven pulley 65 from the rod body 61.

The first short blade assembly 70 includes a fixed horizontal plate 71, a plurality of angularly equidistant first short blades 72, and a cylindrical cover 73. The fixed horizontal plate 71 has a feeding port 711 at a central portion thereof, a plurality of angularly equidistant curved ribs 712 formed on a bottom surface of the fixed horizontal plate 71, and a surrounding wall 713 extending integrally and upwardly from an outer periphery of the fixed horizontal plate 71. Each of the curved ribs 712 extends in a generally radial direction of the fixed horizontal plate 71. Each of the first short blades 72 has a radial outer end that is attached fixedly to the fixed horizontal plate 71, and a triangular radial inner end that extends radially and inwardly into the feeding port 711 in the fixed horizontal plate 71, and that is spaced apart from and that is adjacent to the rod body 61 of the threaded impeller 60. The cover 73 has a surrounding wall 731 connected threadedly to the surrounding wall 713 of the fixed horizontal plate 71, a bottom ring plate 732 having an outer periphery formed integrally with a bottom end of the surrounding wall 731, and a discharge port 733 defined by the ring plate 722. The grass-accepting unit 50, the fixed horizontal plate 71, and the cover 73 constitute cooperatively a container unit that defines a vertical grass passage (P) therein, which has an upper end communicated with the grass inlet 535 in the grass-catching member 53. A shredding chamber (S) is defined between the fixed horizontal plate 71 and the cover 73, and is disposed under the grass passage (P).

The second short blade assembly 80 includes a plurality of angularly equidistant, generally upright second short blades 81, and a horizontal rotary disk 82. A plurality of horizontal mounting plates 811 are formed respectively and integrally with upper ends of the second short blades 81, and are connected fixedly to the bottom surface of the fixed horizontal plate 71 by bolts. The second short blades 81 are disposed in an outer periphery of the shredding chamber (S). The rotary disk 82 is sleeved around the rod body 61 of the threaded impeller 60, is disposed within a central portion of a lower end of the shredding chamber (S), and has a top surface that is formed with a plurality of angularly equidistant, curved ribs 821, each of which extends in a generally radial direction of the rotary disk 82.

The third short blade assembly 80' includes a plurality of equidistant horizontal third short blades 83 attached fixedly to and extending radially and outwardly from the rotary disk 82 and having outer ends that are disposed in the outer periphery of the shredding chamber (S) and that are located slightly lower than the lower ends of the second short blades 81.

A bushing 84 is disposed between the rotary disk 82 and a lower end 62 of the threaded impeller 60. A retainer 85 abuts against a bottom surface of the rotary disk 82. A bolt 86 extends through the retainer 85, and engages a threaded hole in a lower end surface of the rod body 61 of the threaded impeller 60 so as to clamp the rotary disk 82 between the retainer 85 and a shoulder 69 of the rod body 61 of the threaded impeller 60, thereby connecting the rotary disk 82 fixedly to the threaded impeller 60.

Referring to FIGS. 5, 7, and 8, the grass-guiding member 90 has a bottom cover 91 and a top cover 92. The bottom cover 91 has a bottom wall 911, two parallel sidewalls 912, and an end wall 913. The sidewalls 912 have front ends that are connected respectively and fixedly to the ends of the C-shaped surrounding wall 251 (see FIG. 5), and upper ends that are connected fixedly to a bottom surface of the deck 25. The bottom wall 911 has two opposite sides connected respectively and fixedly to lower ends of the sidewalls 912. The end wall 913 has an upper end connected fixedly to the bottom surface of the deck 25, and two opposite sides connected respectively and fixedly to the rear ends of the sidewalls 912. The through hole 255 in the deck 25 is located among the sidewalls 912 and the end wall 913. The bottom cover 91 and the deck 25 define cooperatively a first channel (C1) therebetween for guiding the long grass strips 100 to move from the gap 254 in the C-shaped surrounding wall 251 into the through hole 255 in the deck 25. The top cover 92 is connected fixedly to a top surface of the deck 25 and the grass-catching member 53 so as to define a second channel (C2) between the top cover 92 and the deck 25 such that the through hole 255 in the deck 25 is communicated with the grass inlet 353 in the grass catching member 53.

Referring to FIGS. 3, 5, and 8, during use, the long blade 32 is rotated by the motor 31 to cut grass to form the long grass strips 100 that are thrown into the grass inlet 535 in the grass-catching member 53 through the gap 254 defined by the ends of the C-shaped surrounding wall 251, the first channel (C1), and the second channel (C2). The long grass strips 100 come into contact with the rod body 61 of the threaded impeller 60 so that the helical rib 63 of the threaded impeller 60 moves the long grass strips 100 downwardly along the grass passage (P) in the grass-shredding device 40. Within the feeding port 711 in the fixed horizontal plate 71, the long grass strips 100 are cut by the first short blades 72 to form short grass strips 101 that move into the shredding chamber (S), within which the short grass strips 101 are guided by the curved ribs 712, 821 of the fixed horizontal plate 71 and the rotary disk 82 to move from a central portion of the rotary disk 82 to an outer periphery of the rotary disk 82 to thereby remove the short grass strips 101 radially and outwardly from the rotary disk 82. Hence, the short grass strips 101 are cut by the second and third short blades 81, 83 to form shredded grass 102 that drops from the grass-shredding device 40 through the discharge port 73 onto the lawn so as to serve as humus.

With this invention thus explained, it is apparent that numerous modifications and variations can be made without departing from the scope and spirit of this invention. It is therefore intended that this invention be limited only as indicated by the appended claims.

I claim:

1. A lawn mower comprising:

a vehicle body including a grass-cutting chamber, and a deck that defines a top end of said grass-cutting chamber and that has a through hole which is formed through said deck and which is communicated with said grass-cutting chamber;

a grass-cutting unit disposed on said vehicle body and adapted to cut grass within said grass-cutting chamber in said vehicle body to form long grass strips that are thrown into said through hole in said deck of said vehicle body by said grass-cutting unit; and a grass-shredding device adapted to accent and shred the long grass strips from said through hole in said deck to form shredded grass, said grass-shredding device having a discharge port that is adapted to drop the shredded grass from said lawn mower therethrough, wherein said grass-shredding device includes:

a container unit mounted fixedly to said vehicle body and formed with a shredding chamber at a lower end of said container unit, and a vertical grass passage formed in said container unit above said shredding chamber, said shredding chamber having a feeding port at an upper end thereof, said discharge port in said grass-shredding device being formed in a lower end of said shredding chamber, said grass passage having an upper end that is adapted to accept the long grass strips from said through hole in said deck;

a threaded impeller including an upright rod body extending through said grass passage in said container unit, and a helical rib formed on an intermediate portion of said rod body, the long grass strips coming into contact with said rod body at said upper end of said grass passage and moving downwardly along said impeller within said grass passage;

a first short blade assembly including a plurality of angularly equidistant first short blades that are fixed within said container unit under said helical rib, that extend radially and inwardly into said feeding port of said shredding chamber, and that have radial inner ends which are spaced apart from and which are adjacent to said rod body of said impeller, said first short blades being adapted to cut the long grass strips to form short grass strips;

a second short blade assembly including a plurality of angularly equidistant, generally upright second short blades that are disposed fixedly in said container unit and that are disposed in an outer periphery of said shredding chamber;

a horizontal rotary disk disposed rotatably within a central portion of a lower end of said shredding chamber and adapted to receive the short grass strips from said feeding port of said shredding chamber, said rotary disk being rotatable within said shredding chamber so as to be adapted to move the short grass strips from a central portion of said rotary disk to an outer periphery of said rotary disk, thereby removing the short grass strips radially and outwardly from said rotary disk; and a third short blade assembly including a plurality of angularly equidistant horizontal third short blades attached fixedly to and extending radially and outwardly from said rotary disk and having outer ends disposed in said outer periphery of said shredding chamber and located slightly lower than said lower ends of said second short blades, said second and third short blades cooperating to cut the short grass strips to form the shredded grass that drops from said container unit through said discharge port in said grass-shredding device.

2. The lawn mower as claimed in claim 1, wherein said grass-shredding device further includes a fixed horizontal plate that is disposed fixedly within said container unit and that defines an upper end of said shredding chamber, said feeding port of said shredding chamber being formed through a central portion of said fixed horizontal plate, each of a bottom surface of said fixed horizontal plate and a top surface of said rotary disk being formed with a plurality of angularly equidistant curved ribs, each of which extends in a generally radial direction of a corresponding one of said fixed horizontal plate and said rotary disk so as to guide the short grass strips to move from said central portion of said rotary disk to said outer periphery of said rotary disk.

3. A lawn mower comprising:

a vehicle body including a grass-cutting chamber, a deck that defines a top end of said grass-cutting chamber, and a through-hole which is formed through said deck and which is communicated with said grass-cutting chamber, wherein said vehicle body further includes a C-shaped surrounding wall connected fixedly to and extending downwardly from said deck so as to define said grass-cutting chamber therein, said C-shaped surrounding wall having two spaced-apart ends that define a gap therebetween;

a grass-cutting unit disposed on said vehicle body and adapted to cut grass within said grass-cutting chamber in said vehicle body to form lone grass strips that are thrown into said through-hole in said deck of said vehicle body by said grass-cutting unit, wherein said grass-cutting unit includes a horizontal long blade disposed rotatably within said grass-cutting chamber, and a motor disposed on said deck and having a motor shaft that is connected fixedly to said long blade so as to rotate said long blade within said grass-cutting chamber, thereby removing the long grass strips from said grass-cutting chamber through said gap;

a grass-shredding device adapted to accept and shred the long grass strips from said through-hole in said deck to form shredded grass, said grass-shredding device having a discharge port that is adapted to drop the shredded grass from said lawn mower therethrough, wherein said grass-shredding device further has a grass-catching member that is formed with a grass inlet;

a grass-guiding member that has two parallel vertical sidewalls having front ends that are connected, respectively and fixedly, to said ends of said C-shaped surrounding wall of said vehicle body, rear ends opposite to said front ends of said sidewalls, and upper ends that are connected fixedly to a bottom surface of said deck;

a bottom wall having two opposite sides connected respectively and fixedly to lower ends of said sidewalls;

an end wall having an upper end connected fixedly to said bottom surface of said deck, and two opposite sides connected respectively and fixedly to said rear ends of said sidewalls so that said sidewalls, said bottom wall, and said end wall constitute cooperatively a bottom cover, said through hole in said deck being located among said sidewalls and said end wall, said bottom cover and said deck cooperatively a first channel therebetween for guiding the long grass strips from said gap in said C-shaped surrounding wall into said through hole in said deck; and a top cover connected fixedly to a top surface of said deck and said grass-catching member so as to define a second channel between said top cover and said deck such that said through hole in said deck is communicated with said grass inlet in said grass-catching member through said second channel.

* * * * *